(12) United States Patent
Nilsson et al.

(10) Patent No.: US 10,408,284 B2
(45) Date of Patent: Sep. 10, 2019

(54) HYDRAULIC SYSTEM FOR A VEHICLE

(71) Applicant: BorgWarner TorqTransfer Systems AB, Landskrona (SE)

(72) Inventors: Kristoffer Nilsson, Lund (SE); Bo Lundstrom, Glumslöv (SE); Per-Olof Davidsson, Hjärup (SE); Gustaf Lagunoff, Malmö (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 15/114,189

(22) PCT Filed: Jan. 31, 2015

(86) PCT No.: PCT/EP2015/052025
§ 371 (c)(1),
(2) Date: Jul. 26, 2016

(87) PCT Pub. No.: WO2015/114125
PCT Pub. Date: Aug. 6, 2015

(65) Prior Publication Data
US 2016/0363180 A1    Dec. 15, 2016

(30) Foreign Application Priority Data

Jan. 31, 2014  (SE) ...................................... 1450110
Jun. 5, 2014  (SE) ...................................... 1450687

(51) Int. Cl.
*F16D 48/02* (2006.01)
*B60K 17/02* (2006.01)
(Continued)

(52) U.S. Cl.
CPC .............. *F16D 48/02* (2013.01); *B60K 17/02* (2013.01); *B60K 17/344* (2013.01); *B60K 23/08* (2013.01);
(Continued)

(58) Field of Classification Search
CPC .. F16D 48/02; F16D 25/14; F16D 2048/0221; F16D 2048/0242;
(Continued)

(56) References Cited

U.S. PATENT DOCUMENTS 4,549,564 A * 10/1985 Halabiya ................. F15B 11/02
  137/110
5,546,751 A * 8/1996 Last ........................ F16H 61/40
  60/424

(Continued)

FOREIGN PATENT DOCUMENTS

CN        102032339 A     4/2011
EP         0139776 A1     5/1985
(Continued)

OTHER PUBLICATIONS

Translation of First Notification of CN Office Action dated Jul. 21, 2017, CN Application No. 20158000667.1; Applicant: BorgWarner TorqTransfer Systems AB, 8 pages.
(Continued)

*Primary Examiner* — David R Morris
(74) *Attorney, Agent, or Firm* — BrooksGroup

(57) ABSTRACT

A hydraulic system including a hydraulically actuated clutch, a hydraulically actuated shifting piston, and a pressure source for actuating the clutch as well as the shifting piston. The movement of the shifting piston also controls a valve function which serves to open a connection from the pressure source to the clutch only when the shifting piston has reached one of its end positions.

11 Claims, 17 Drawing Sheets

(51) Int. Cl.
*B60K 17/344* (2006.01)
*B60K 23/08* (2006.01)

(52) U.S. Cl.
CPC ...... *F16D 25/14* (2013.01); *F16D 2048/0221* (2013.01); *F16D 2048/0233* (2013.01); *F16D 2048/0242* (2013.01); *F16D 2048/0248* (2013.01); *F16D 2048/0266* (2013.01); *F16D 2048/0269* (2013.01); *F16D 2048/0275* (2013.01); *F16D 2048/0284* (2013.01); *F16D 2048/0293* (2013.01); *F16D 2500/1024* (2013.01); *F16D 2500/10431* (2013.01); *F16D 2500/3026* (2013.01)

(58) Field of Classification Search
CPC ..... F16D 2048/0248; F16D 2048/0266; F16D 2048/0275; F16D 2048/2084; F16D 2048/0293; F16D 2500/10431; B60K 17/344; B60K 17/3467; B60K 23/08; B60K 23/0808
See application file for complete search history.

(56) References Cited

U.S. PATENT DOCUMENTS

| | | | |
|---|---|---|---|
| 6,755,703 | B1 | 6/2004 | Erickson |
| 8,708,123 | B2 * | 4/2014 | Nilsson ................ F04B 1/2035 192/103 FA |
| 2002/0162328 | A1 | 11/2002 | Shaw et al. |
| 2006/0105883 | A1 * | 5/2006 | Krisher ................ B60K 17/344 477/175 |
| 2011/0077122 | A1 | 3/2011 | Lundberg et al. |
| 2012/0090416 | A1 | 4/2012 | Kao et al. |
| 2012/0244023 | A1 * | 9/2012 | Nilsson ................ F04B 1/2035 417/410.1 |
| 2013/0281253 | A1 | 10/2013 | Ross et al. |
| 2014/0008172 | A1 * | 1/2014 | Lundstrom ............. F16D 48/02 192/70.12 |
| 2016/0010698 | A1 * | 1/2016 | Lundstrom ......... F16D 25/0638 251/28 |
| 2016/0010706 | A1 * | 1/2016 | Lundstrom ............. F16D 25/14 192/85.01 |

FOREIGN PATENT DOCUMENTS

| | | |
|---|---|---|
| JP | S58102832 U | 7/1983 |
| JP | S6170254 A | 4/1986 |

OTHER PUBLICATIONS

Japanese Office Action dated Nov. 20, 2018 ; Application No. 2016-548306; Applicant: BorgWarner Sweden AB; 2 pages.

* cited by examiner

HYDRAULIC SYSTEM FOR A VEHICLE

This application claims the benefit of Swedish Application Nos. 1450110-0 filed Jan. 31, 2014, 1450687-7 filed Jun. 5, 2014 and PCT Application No. EP2015/052025 filed Jan. 31, 2015.

TECHNICAL FIELD

The present invention related to a hydraulic system for a vehicle. More particularly, the present invention relates to a hydraulic system for controlling an AWD coupling as well as low/high range gear of a transfer case.

BACKGROUND

All wheel drive (AWD) vehicles with a drivetrain topology including a Transfer Case with a selectable low range gear have existed on the market for many years. In the simplest form the low range gear is selected with an additional shift lever. In modern vehicles there is an increasing need for controllability and functionality of the low range gear. Such requirements can include the ability to "shift on the move", i.e. the possibility to change low/high range without a complete stand-still of the vehicle. It's also desirable that the shifting of low/high range can be performed without actuating the AWD clutch at the same time, as that might influence the vehicle behavior negatively, as for example locking up the front and rear axle in a parking maneuver.

To meet the new requirements the shifting is normally controlled by an actuator rather than a manual lever. When combined with controllable AWD, such systems tend to be complex, heavy and include several actuators, mechanisms and sensors.

There are existing electromechanical systems utilizing just one actuator for both shifting and clutch actuation. The drawback of these electromechanical systems are that they tend to by heavier, be less flexible for packaging, have worse torque accuracy and controllability, need a more complex control strategy and have a higher peak current consumption.

There are also prior art hydraulic solutions as shown in FIG. 1, illustrating an example of an existing hydraulic solution for 2-Speed Transfer Cases using a pressure controlling pump, like e.g. a pump as described in WO2011043722, for both shift actuation and AWD clutch actuation. The drawbacks of this design are that the design tend to utilize multiple actuators which results in higher cost, weight and packaging size. Normally they are also designed with a slide valve which requires high cleanliness and an oil filter.

SUMMARY

An object of the present invention is to provide a hydraulic system which uses the movement of a shifting piston to also achieve a valve function. The hydraulic system is preferably used in applications requiring torque control between a coupling and a gear switch, such as transfer case applications wherein the hydraulic system serves to open a connection from the pressure source to the AWD clutch piston only when the shifting piston has reached one of its end positions.

According to aspects of the present invention, a hydraulic system is provided in accordance with the features set forth in the independent claims. Preferred embodiments are defined by the appended dependent claims.

BRIEF DESCRIPTION OF DRAWINGS

Embodiments of the invention will be described in the following; reference being made it the appended drawings which illustrate non-limiting examples of how the inventive concept can be reduced into practice.

DETAILED DESCRIPTION

Although the embodiments of a hydraulic system will be described mainly with reference to transfer case applications, it should be realized that the inventive concept is not limited to such applications but could be implemented for various vehicle applications in which torque control between e.g. a coupling and a gear shift is required.

Figure 1:
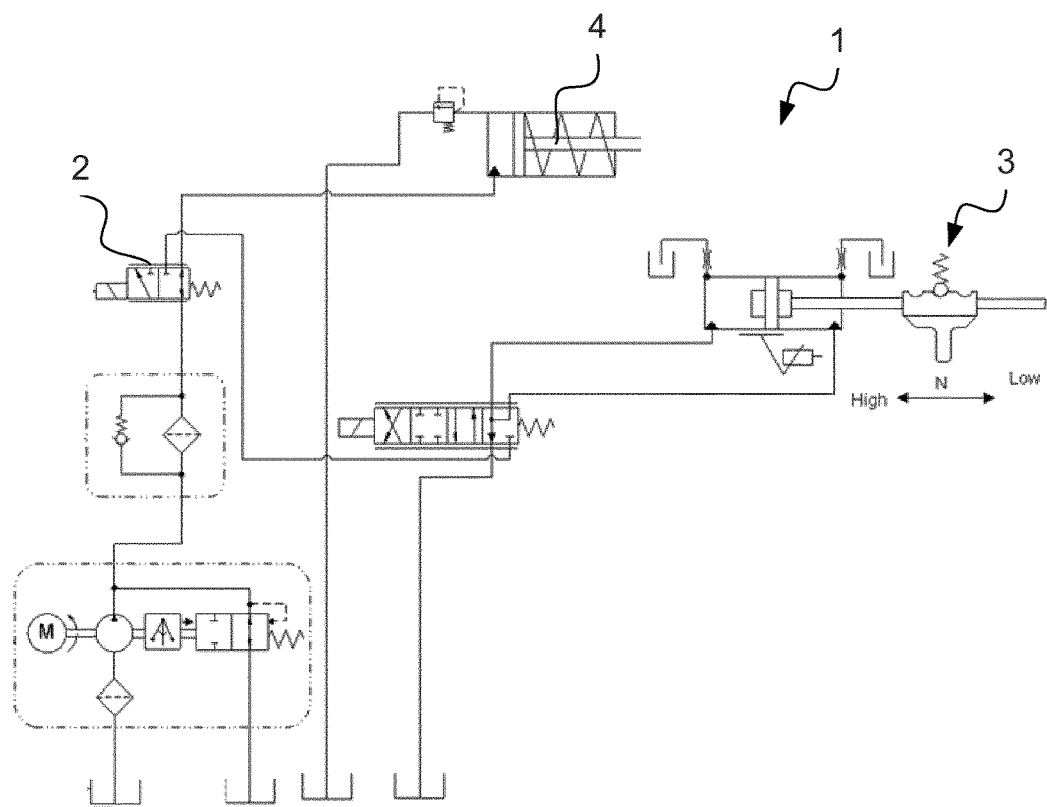
FIG. 1 is a schematic view of a prior art hydraulic system for 2-Speed Transfer Cases using a pressure controlling pump for both shift actuation and AWD-Clutch actuation.

Now turning to the specific transfer case application, one of the challenges using one actuator for both the AWD clutch and the shift function is to meet the requirement to not have any AWD clutch torque when shifting range gear. For the existing hydraulic system 1 shown in FIG. 1 this is solved by a separate valve 2 which will divert the flow/pressure to either the shifting mechanism 3 or to the AWD clutch piston 4.

The invention described here is to instead use the movement of the shifting piston to also achieve a valve function, which serves to open a connection from the pressure source (i.e. a pump assembly) to the AWD clutch piston only when the shifting piston has reached one of its end positions, i.e. when the shifting maneuver is complete.

By reducing the pressure once the shifting has been completed the activation of unintentional torque transfer in the AWD clutch can be avoided during shifting.

As a pressure source for shifting a reversible pressure regulating pump assembly can be used or as an alternative a one directional pressure regulating pump assembly in combination with a 4/2-direction valve to reverse the flow directions.

The valve function activated by the piston movement can be realized in many ways, but a seat type valve may be preferable due to its lower sensitivity to contamination. In the drawings some examples using the piston sealings themselves are shown to achieve the valve function, some examples using the piston movement to actuate separate valves, and an example of using a pilot controlled valve.

Figure 2:
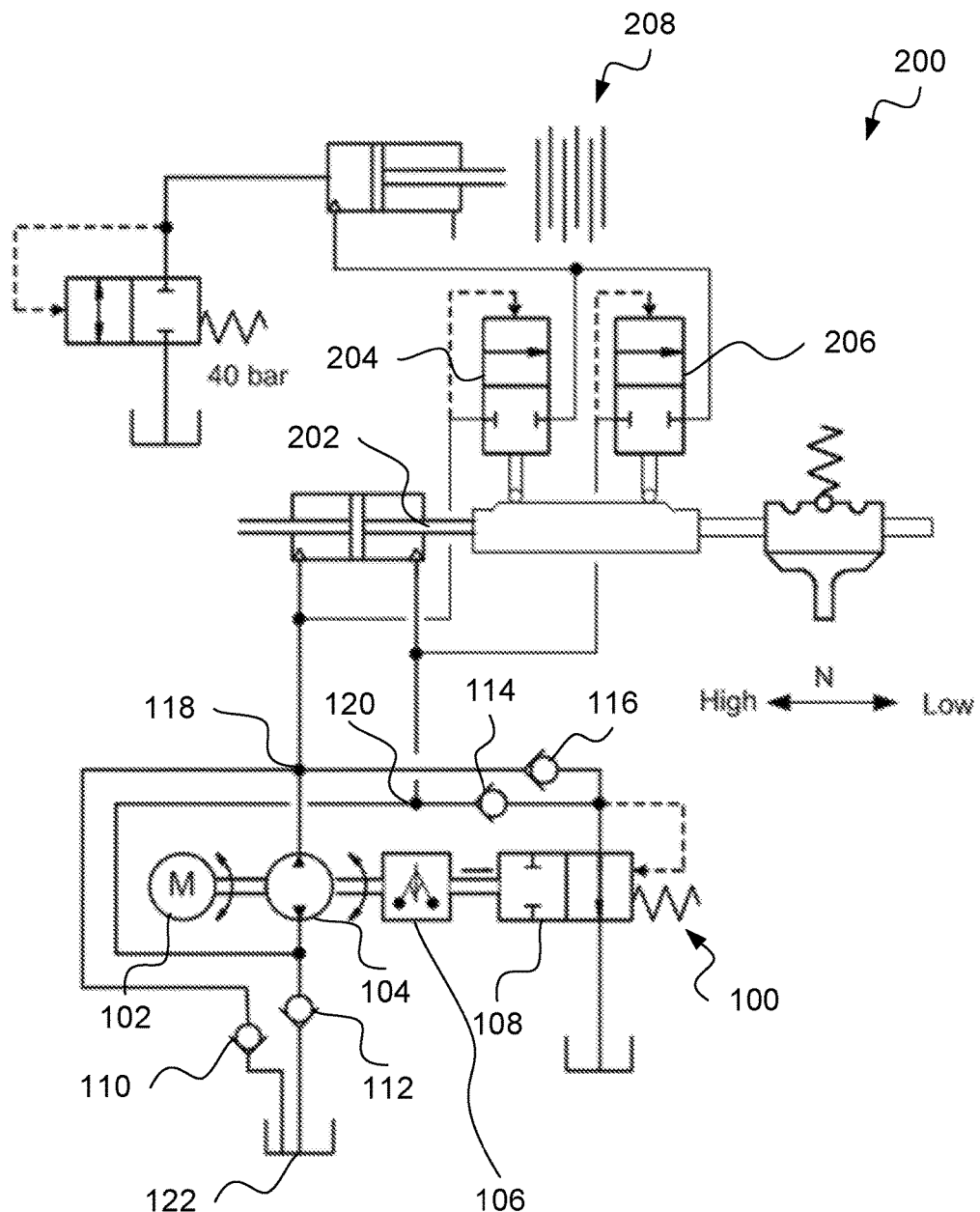
FIG. 2 shows a hydraulic scheme of a hydraulic system according to an embodiment comprising a reversible pump assembly combined with mechanically actuated piston valves.

Starting with FIG. 2 a hydraulic system 200 is shown. The hydraulic system 100 comprises a reversible pump assembly 100 for applying a pressure on both sides of a shifting piston 202. Moving the piston 202 will urge one of two valves 204, 206 to open, thereby allowing hydraulic pressure to be applied to the AWD clutch 208.

The pump assembly 100 comprises a motor 102 and a hydraulic pump 104, as well as a centrifugal regulator 106 in connection with a pressure overflow valve 108. The pump assembly 100 may e.g. be based on the same principle as described in EP2310709 or in EP2486279, both by the same applicant as the present application. The pump assembly 100 is preferably provided with bidirectional control whereby a simple and safe solution is achieved by using positive or negative voltage.

By adding two input check valves 110, 112 and two output check valves 114, 116 the direction of the flow is dependant on the motor direction of rotation. As can be seen in FIG. 2, a first port 118 may be connected to a first actuator (not shown), such as a hydraulically operated coupling or a hydraulically operated gear shift, and a second port 120 may be connected to a second actuator (not shown), such as a hydraulically operated coupling or a hydraulically operated gear shift.

When the motor 102 is rotating in a first direction, hydraulic fluid will be drawn from the reservoir 122 via the first input check valve 110, through the pump 104, to the second port 120. The first output check valve 114 is in fluid connection with the overflow valve 108.

When the motor 102 is rotating in the opposite direction, hydraulic fluid will be drawn from the reservoir 122 via the second input check valve 112, through the pump 104, to the first port 118. The second output check valve 116 is in fluid connection with the overflow valve 108.

A third port 124 may also be provided. The third port 124 could be used in combination with one of the first port 118 or second port 120 or together with both the first and second ports 118, 120. Pressure from the third port 124 will be independent of direction of rotation of the motor 102.

Figure 3:
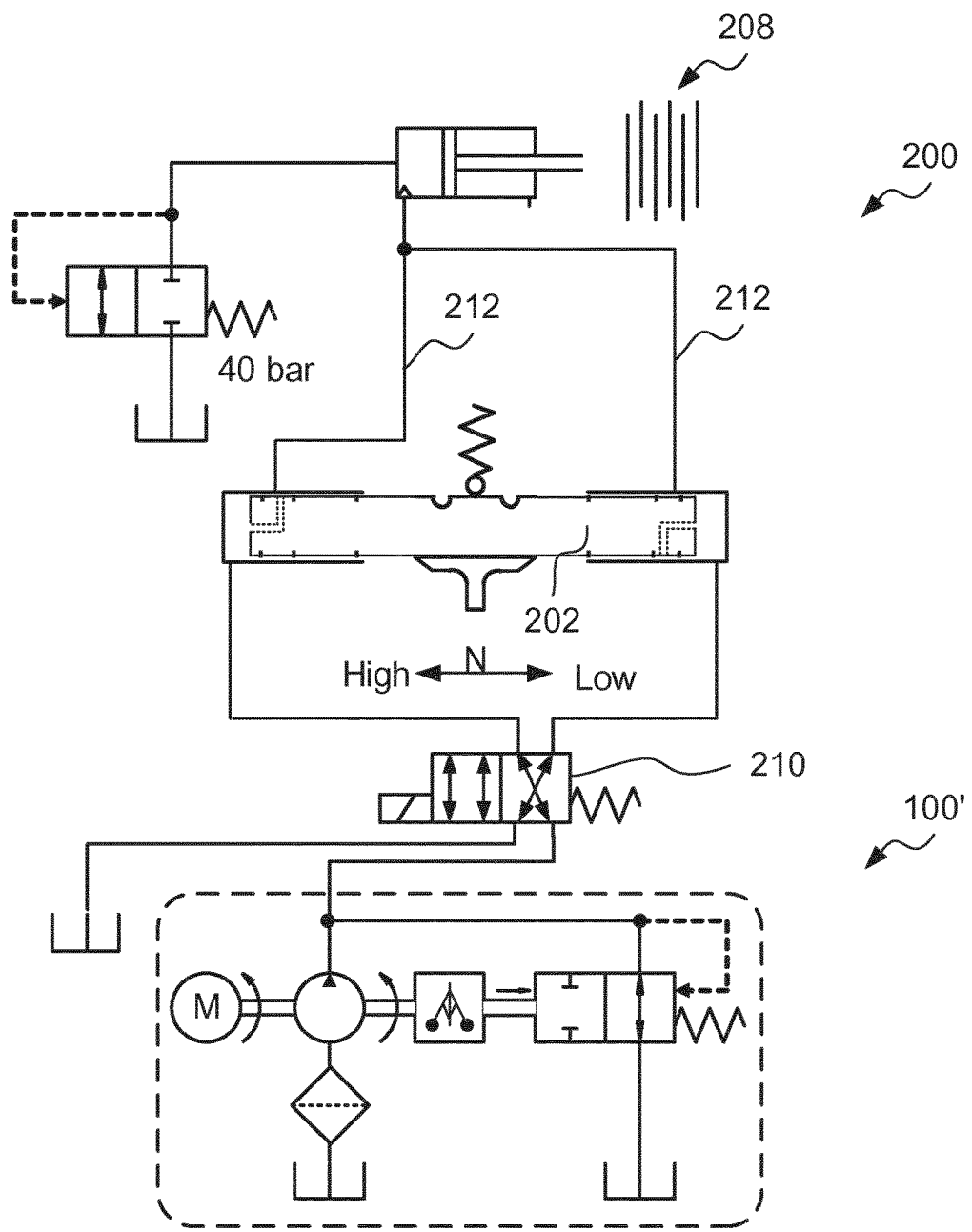
FIG. 3 shows a hydraulic scheme of a hydraulic system according to an embodiment comprising a pump assembly combined with a direction valve and a piston valve.

FIG. 3 shows another embodiment of a hydraulic system 200 in which a pump assembly 100' is arranged in series with a directional valve 210. A shifting piston 202 is moving when pressurized by means of the pump assembly 100'; when the shifting piston 202 moves a channel 212 will open allowing hydraulic pressure to be applied to the AWD clutch 208. The position of the directional valve 210 will determine on which side of the shifting piston 202 pressure will be applied.

The pump assembly 100' has a similar configuration as compared to the pump assembly 100 of FIG. 2. However, the pump assembly 100' of FIG. 3 has no check valves 110, 112, 114, 116. The solenoid actuated direction valve 210 is preferably of a seat valve type.

Figure 4:
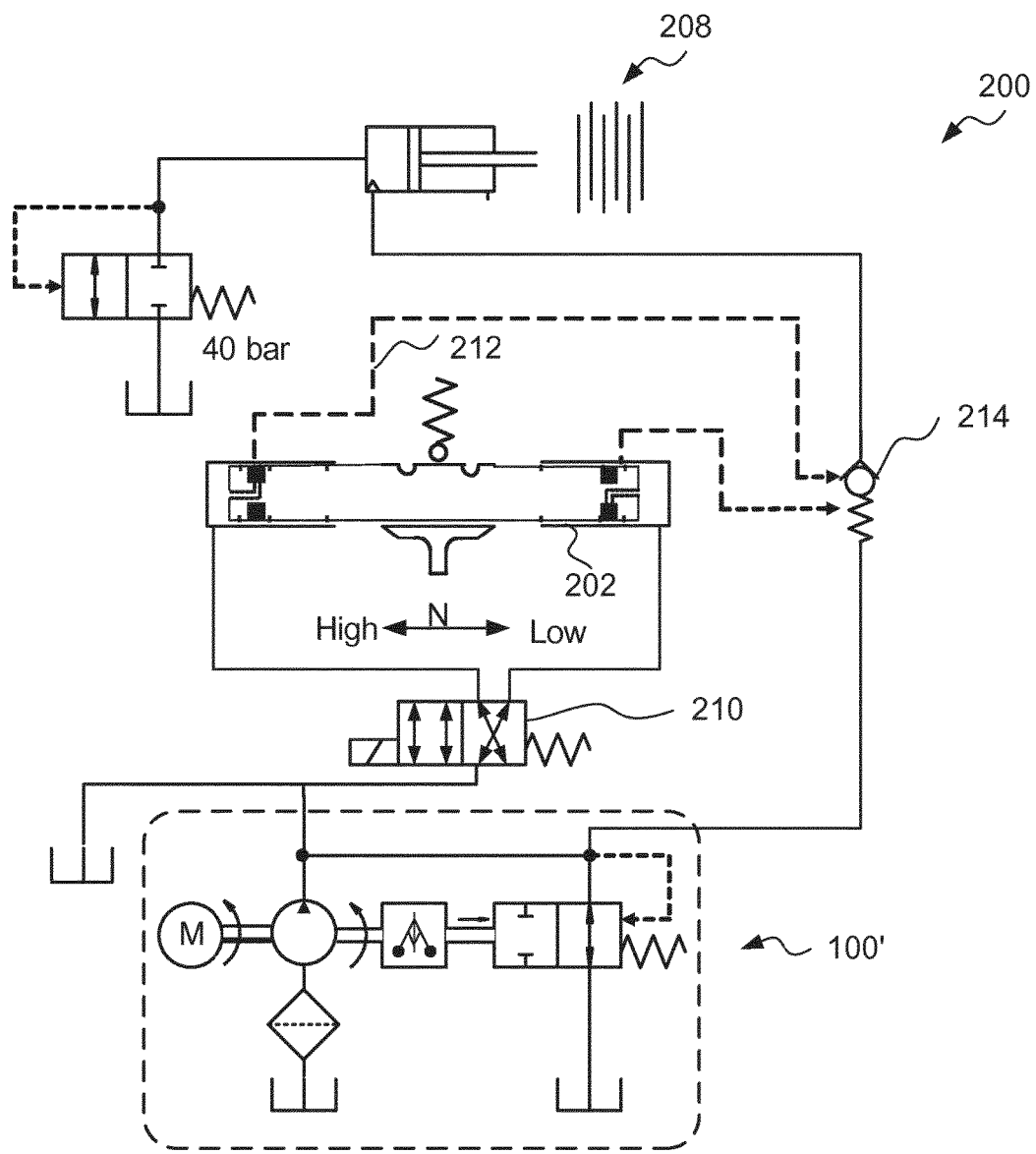
FIG. 4 shows a hydraulic scheme of a hydraulic system according to an embodiment comprising a pilot controlled ball valve enabling the use of only two piston sealings.

FIG. 4 shows a hydraulic system 200 being modification of the embodiment shown in FIG. 3. Here, the hydraulic pressure from the shifting piston channels 212 is used to control a ball valve 214, instead of actuating the AWD clutch 208. Pressurized fluid is provided to the AWD clutch 208 directly from the pump assembly 100' via the ball valve 214, instead of via the shifting piston channels 212.

Figure 5:
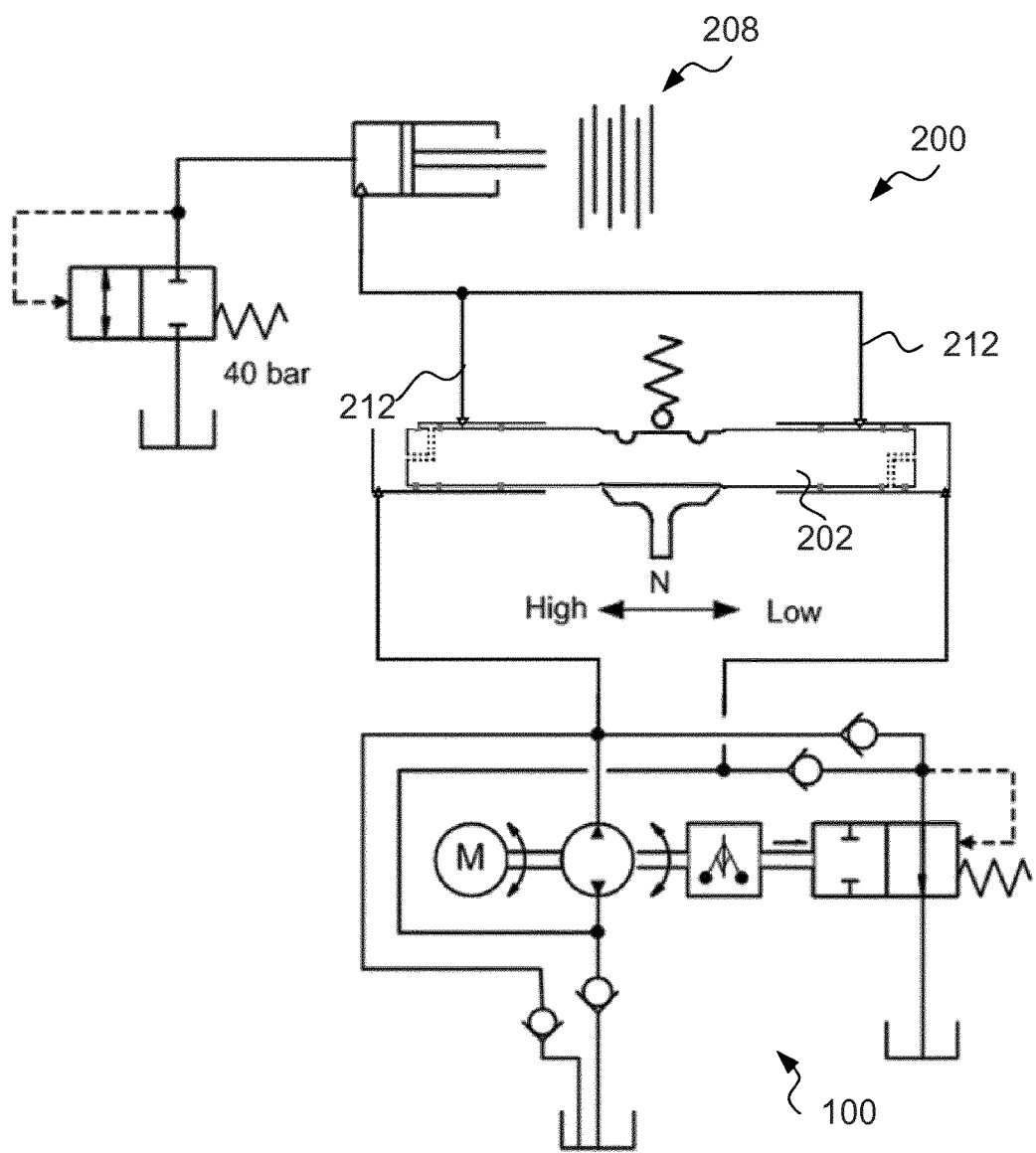
FIG. 5 shows a hydraulic scheme of a hydraulic system according to an embodiment comprising a reversible pump assembly combined with piston valves.

FIG. 5 shows another embodiment of a hydraulic system 200. The shown embodiment is a combination of the embodiments shown in FIG. 2 and FIG. 3. In particular, the pump assembly 100' and the directional valve 210 of FIG. 3 has been replaced by the reversible pump assembly 100 of FIG. 2.

Figure 6:
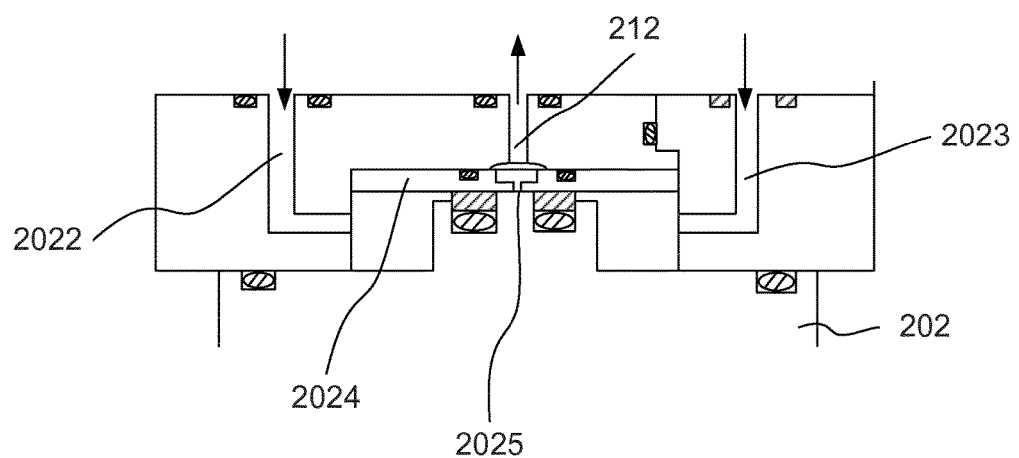
FIGS. 6 and 7 are cross-sectional views showing a piston valve function realized with piston seals and a sleeve.

An embodiment of a shifting piston 202 is shown in FIG. 6. The shifting piston 202 is axially moveable inside a cylinder 2021. Pressurized fluid may enter the cylinder 2021 via channels 2022, 2023 being in fluid communication with a fluid outlet of the pump assembly 100, 100'. The shifting piston 202 is surrounded by a plastic insert 2024 having several holes 2025 along its periphery. In its idle position the shifting piston 202 will block the holes 2025. However, as the shifting piston 202 moves axially the holes 2025 will be exposed to pressurized fluid flowing from one of the channels 2022, 2023. Hence, pressurized fluid will flow out through the holes 2025 to the AWD clutch via the channels 212. Moving the shifting piston 202 will thus allow fluid to flow through the holes 2025 for actuating the AWD clutch 208.

Figure 7:
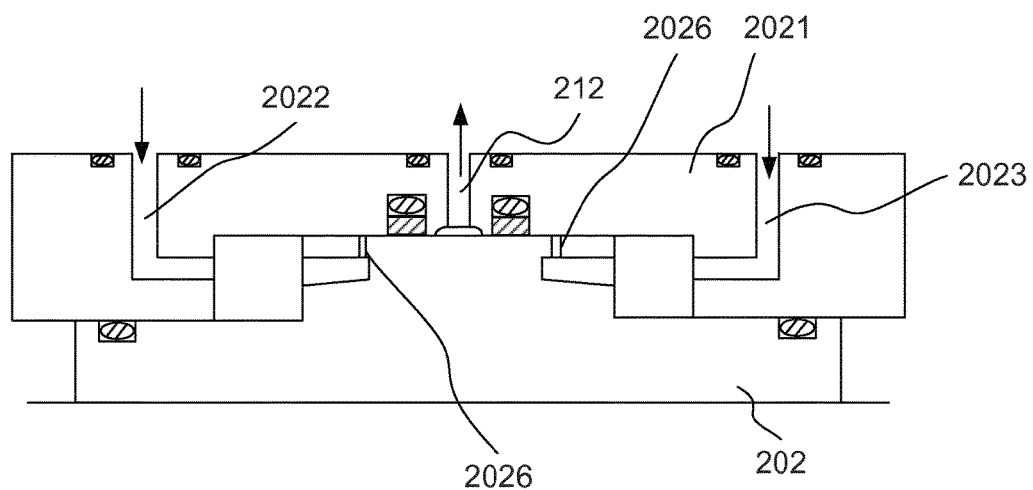

Another embodiment of the shifting piston 202 is shown in FIG. 7, the embodiment being a modification of the embodiment shown in FIG. 6. As shown in FIG. 7, the plastic insert has been removed and the shifting piston 202 itself has been provided with circumferential holes 2026 providing the same functionality as described above with reference to FIG. 6.

Figure 8:
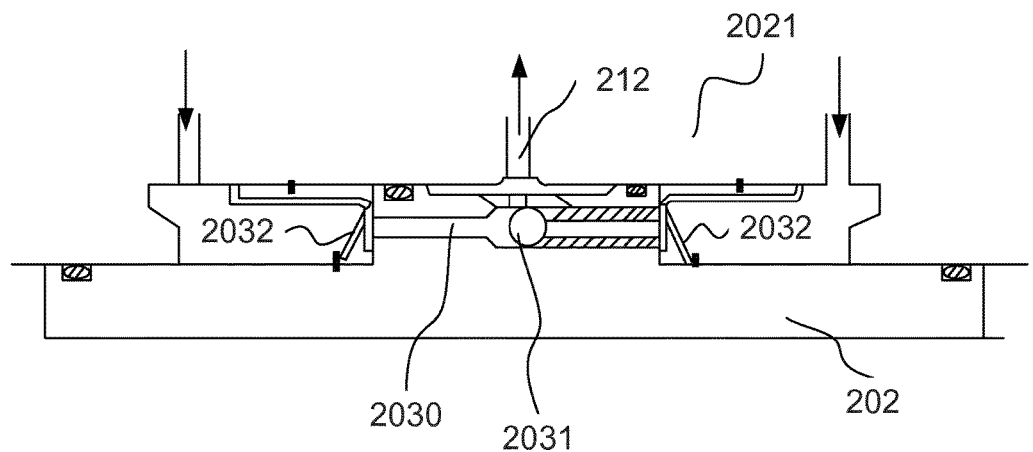
FIG. 8 is a cross-sectional view showing a piston valve function realized with spring valves in the piston.

FIG. 8 shows a further embodiment of the shifting piston 202. The shifting piston 202 is provided with a through-hole 2030 forming a channel between the respective piston sides of the cylinder 2021. A ball 2031 is situated inside the through-hole 2030 and is allowed to move along the through-hole 2030 for blocking and exposing an inlet to the channel 212 connecting the cylinder 2021 with the AWD clutch. At each end of the through-hole 2030 a spring 2032 is arranged, sealing off the respective inlets of the through-hole 2030 when the shifting piston 202 is in its idle position. Hence two springs are provided on opposite sides of the shifting piston 202, each spring 2032 sealing off a fluid channel inside the shifting piston 202. When the piston 202 is urged to move one of the springs 2032 will deflect and open the channel. The ball 2031 inside the piston 202 acts as a valve for directing the fluid flow to the AWD clutch.

Figure 9:
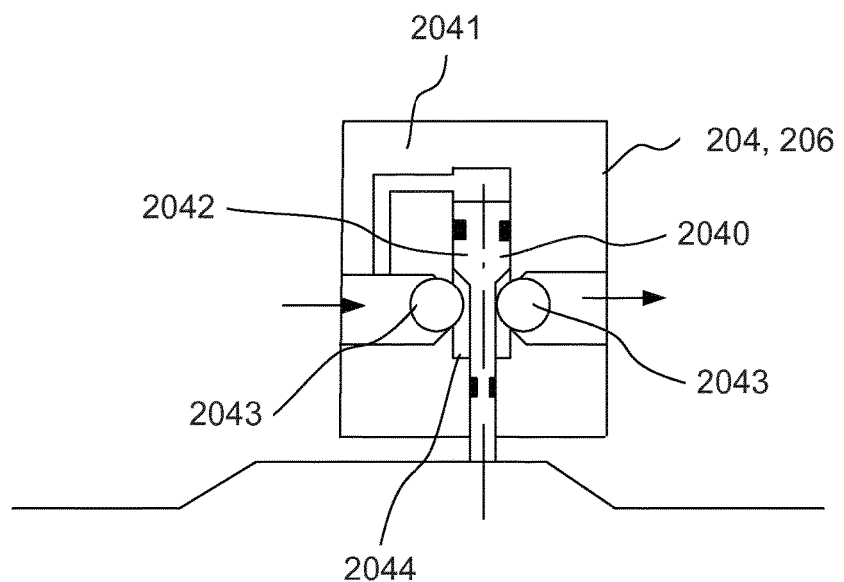
FIG. 9 is a cross-sectional view of a piston valve realized as mechanically activated seat valve.

FIG. 9 shows an example of a valve 204, 206 to be used with the hydraulic system shown in FIG. 2. When the shifting piston 202 moves a valve pin 2040 will be allowed to move downwards inside a valve housing 2041, thus opening a channel 212 to the AWD clutch. Opening of the channel 212 is achieved as a thicker portion 2042 of the valve pin 2040 will urge two balls 2043 to move axially away from a bore 2044 connecting the pump assembly 100 and the AWD clutch 208. The movement of the pin 2040 may e.g. be accomplished by a cam surface (not shown).

Figure 10:
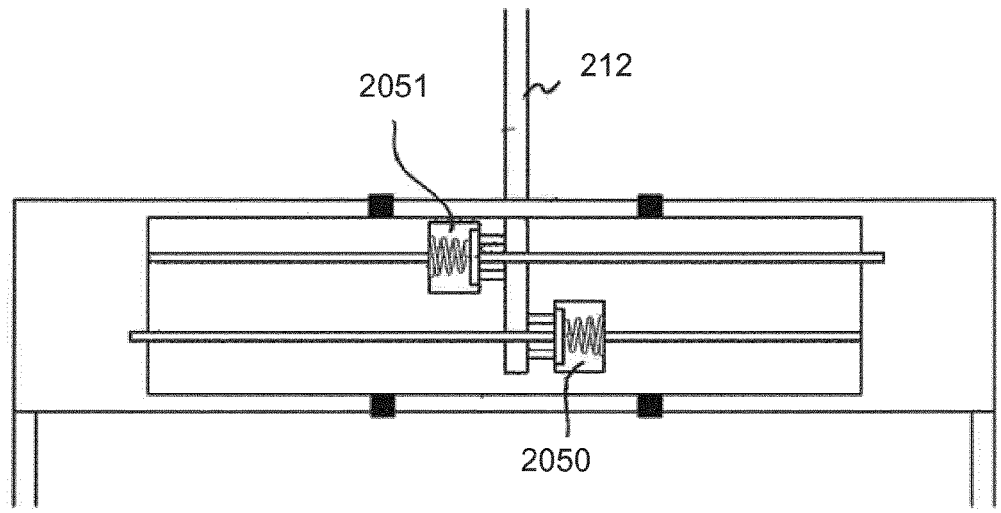
FIG. 10 is a cross-sectional view showing a piston valve function realized with check valves controlled by pins.

FIG. 10 shows a yet further embodiment of a hydraulic system 200 in which the valve functionality, i.e. the functionality provided by means of the valves 204, 206 in FIG. 2, is provided by two separate check valves 2050, 2051. Each check valve is preferably controlled by a respective pin.

Figure 11:
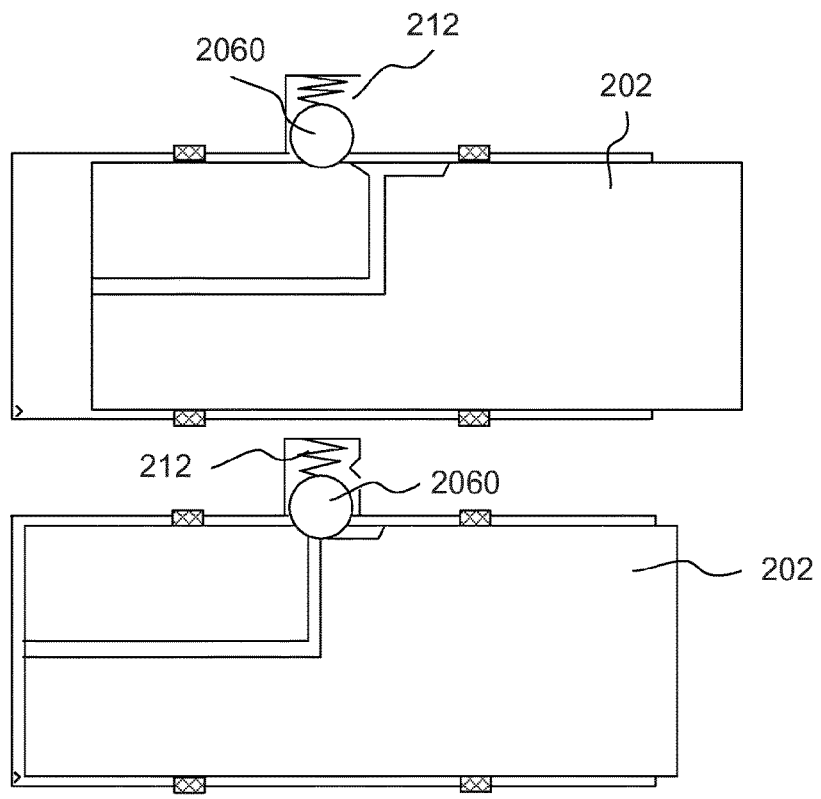
FIG. 11 is a schematic view of a piston valve function realized as a part of the gear retention mechanism.

FIG. 11 shows an embodiment in which the valve functionality forms part of the gear retention mechanism. A spring-biased ball 2060 is provided and used to keep the shifting piston 202 at a desired position. Further, the fluid channel 212 connecting the pump assembly 100, 100' with the AWD clutch 208 is arranged such that it will be blocked by the ball 2060 during shifting.

Figure 12:
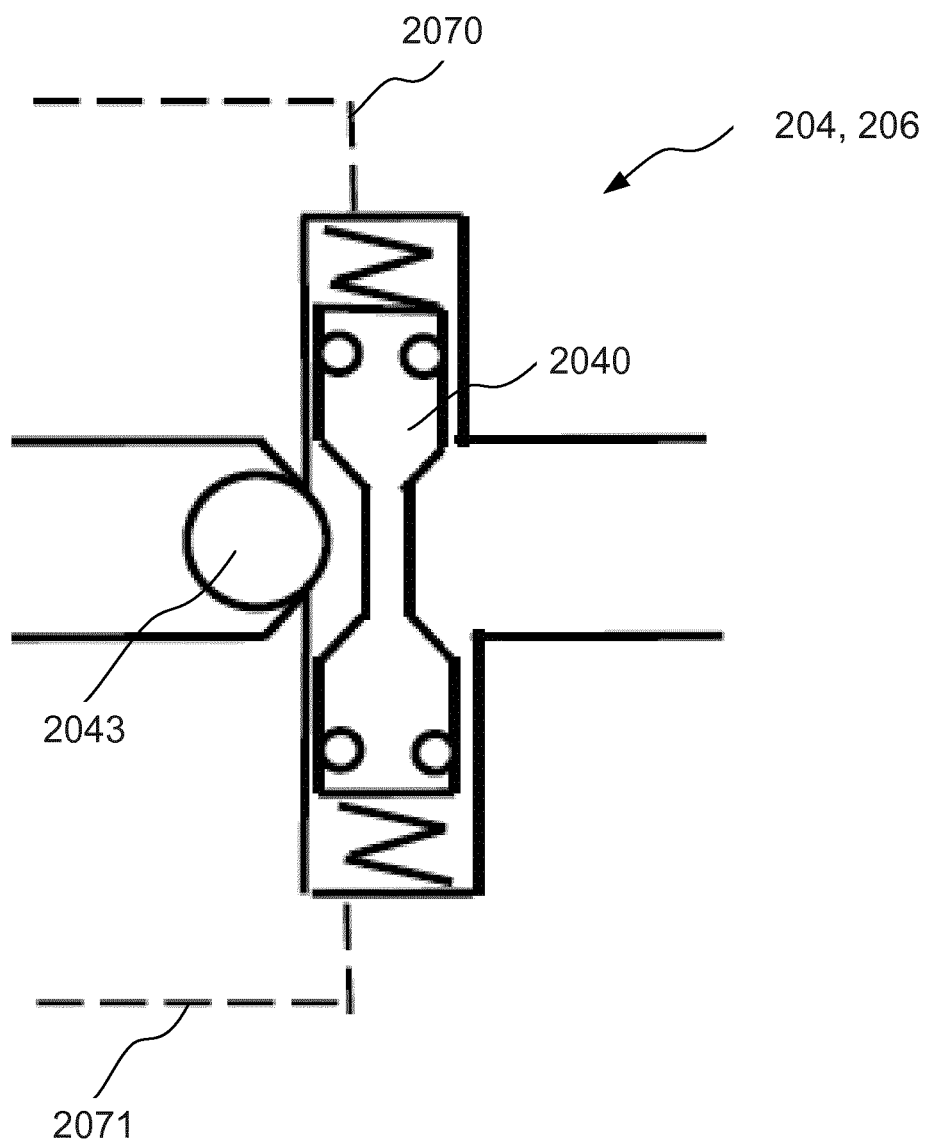
FIG. 12 is a cross-sectional view of a pilot controlled ball valve with dual inputs.

FIG. 12 shows a yet further embodiment of a valve 204, 206 to be used with the hydraulic system 200 of FIG. 2. In this embodiment the pilot controlled ball valve 204, 206 has dual inputs 2070, 2071 whereby the channel 212 to the AWD clutch will open once the pilot pressure is sufficient to move the valve pin 2040.

Figure 13A:
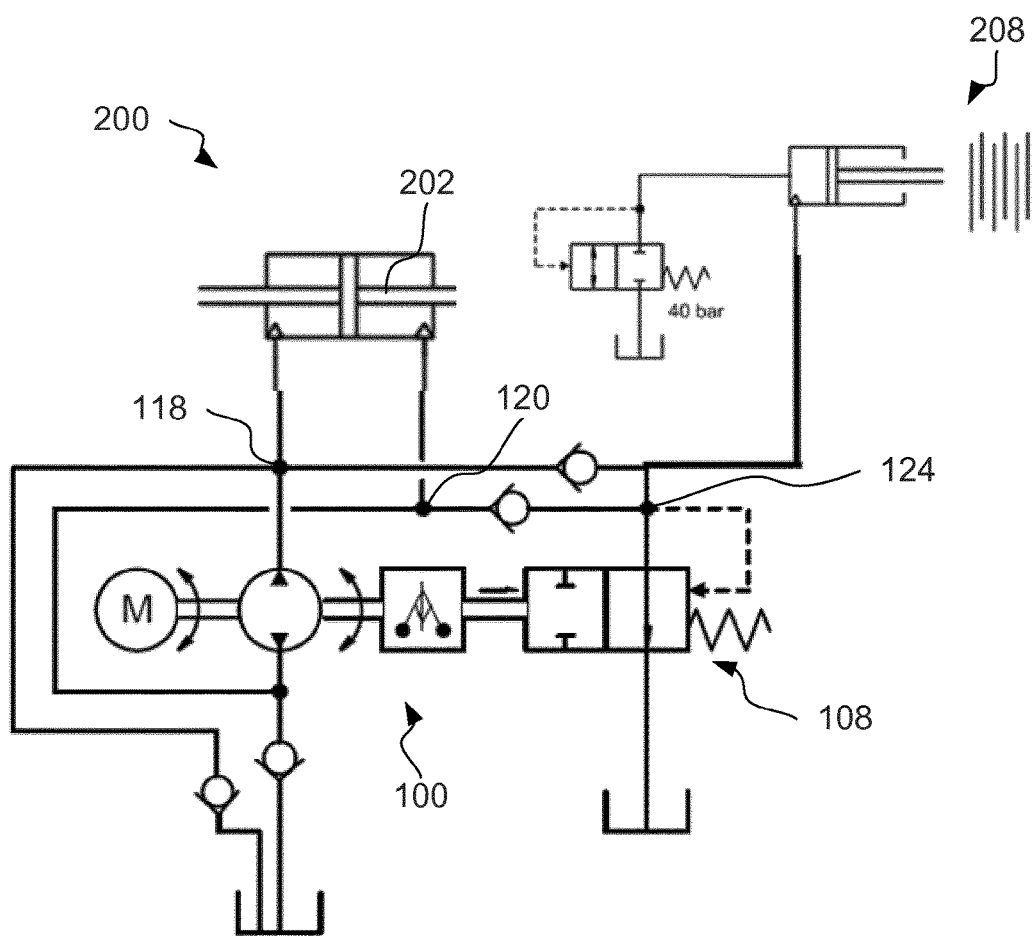
FIG. 13a shows a hydraulic scheme of a hydraulic system according to an embodiment.

FIG. 13a shows an embodiment of a hydraulic system 200 using a reversible pump assembly 100 having a first port 118 for providing pressure to one actuator (i.e. one side of the shifting piston 202), and a second port 120 for providing pressure to a second actuator (i.e. the opposite side of the shifting piston 202). A third port 124 is provided and connected to the pressure overflow valve 108. This embodiment uses the third port 124 to provide pressure to the AWD coupling 208, while the first and second ports 118, 120 are used to provide pressure to both sides of the shifting piston 202. In this embodiment the shifting piston 202 will be pressurized simultaneously as the AWD coupling 208 is actuated. Such embodiment may be advantageous in cases where there are no requirements on "shift on the move"

Figure 13B:
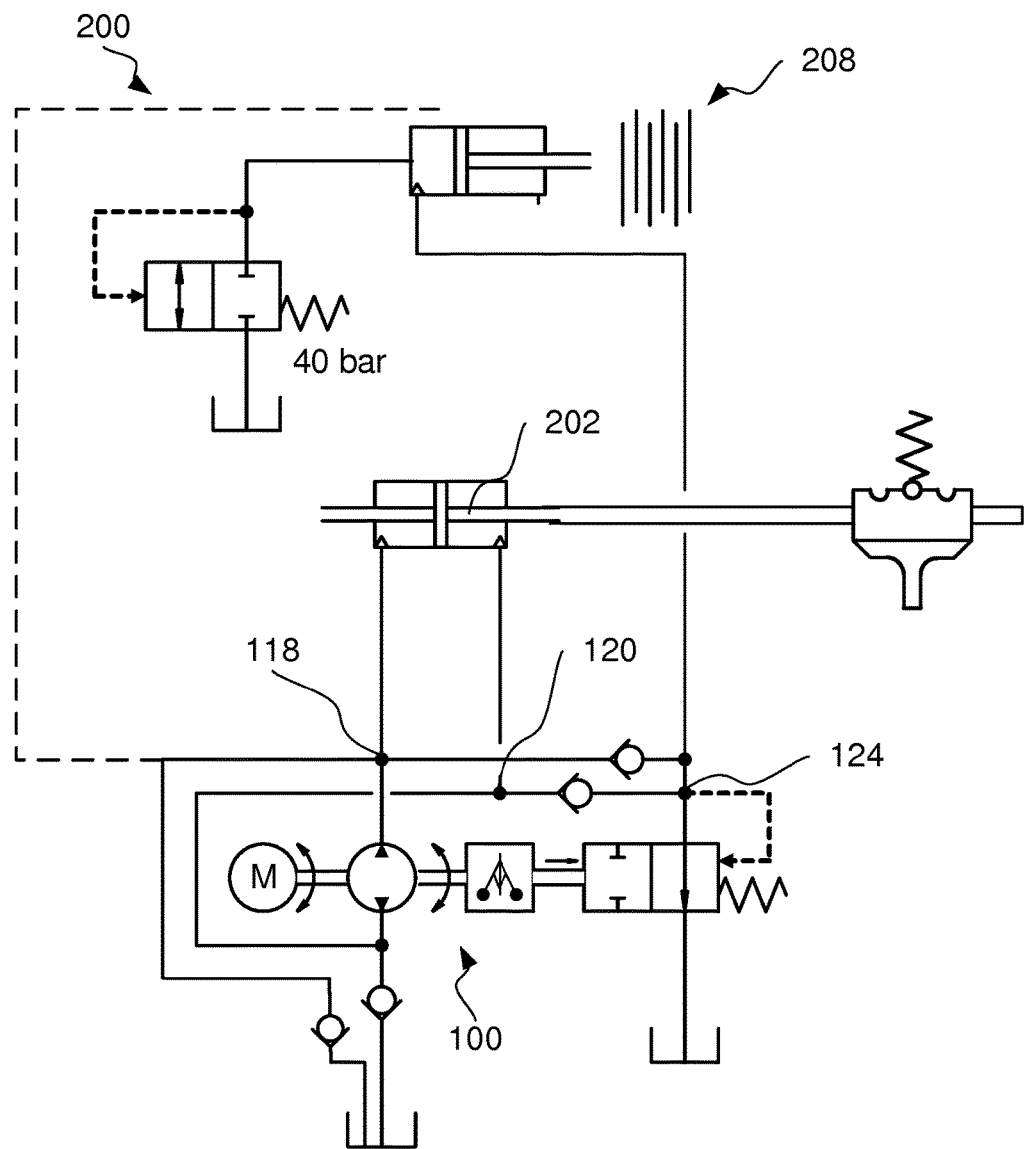
FIG. 13b-d shows hydraulic schemes of hydraulic systems according to other embodiments.

FIG. 13b shows a further embodiment for use in applications requiring mechanical lock of the AWD only in low gear range. A mechanical lock for this kind of transfer case is e.g. described in the co-pending application SE1450471-6 by the same applicant. The first port 118 will be pressurized when the pump assembly 100 is operated in a first direction, which pressurization will correspond to a shifting from 1 (low range lock) to 2 (neutral) or from 2 (neutral) to 3 (high range auto/lock), or when requesting AWD torque in 3 (high range auto). The second port 120 will be pressurized when the pump assembly 100 is operated in a reversed direction, and corresponds to shifting from 3 to 2 or from 2 to 1. The dashed line indicates a connection to the clutch lock function as an alternative to the lock dog clutch. The stroke of the shift piston 202 will actuate both range shift (1-2-3) as well as AWD lock. In a preferred embodiment a position sensor is provided for detecting the position of the piston 202.

The embodiment of FIG. 13b thus provides a hydraulic system for a transfer case having a range shift, a mechanical lock, as well as an AWD clutch. In the low range lock (1) the range shift is in position "1", the mechanical lock is in a locked position, and the AWD clutch is open. In neutral (2) the range shift is in neutral position, the mechanical lock is in an open position, and the AWD clutch 208 is open. The high range auto/lock (3) corresponds to arranging the range shift in a high position, the mechanical lock being open while the AWD clutch 208 is active. Low range will always be locked by the mechanical lock (e.g. a dog clutch or clutch lock mechanism). High lock will be provided by means of the AWD clutch 208 when high lock is selected, and torque will be controlled by the AWD clutch 208 when the system is arranged in high lock auto. During operation, the actuator puts the transfer case in low range lock after driving in high lock to ensure park lock on all four wheels. The transfer case will correspondingly remain in low range lock after driving in that mode. Range shift and AWD lock is preferably actuated through springs to ensure they will be engaged also after power of if initial engagement blocks.

Figure 13C:
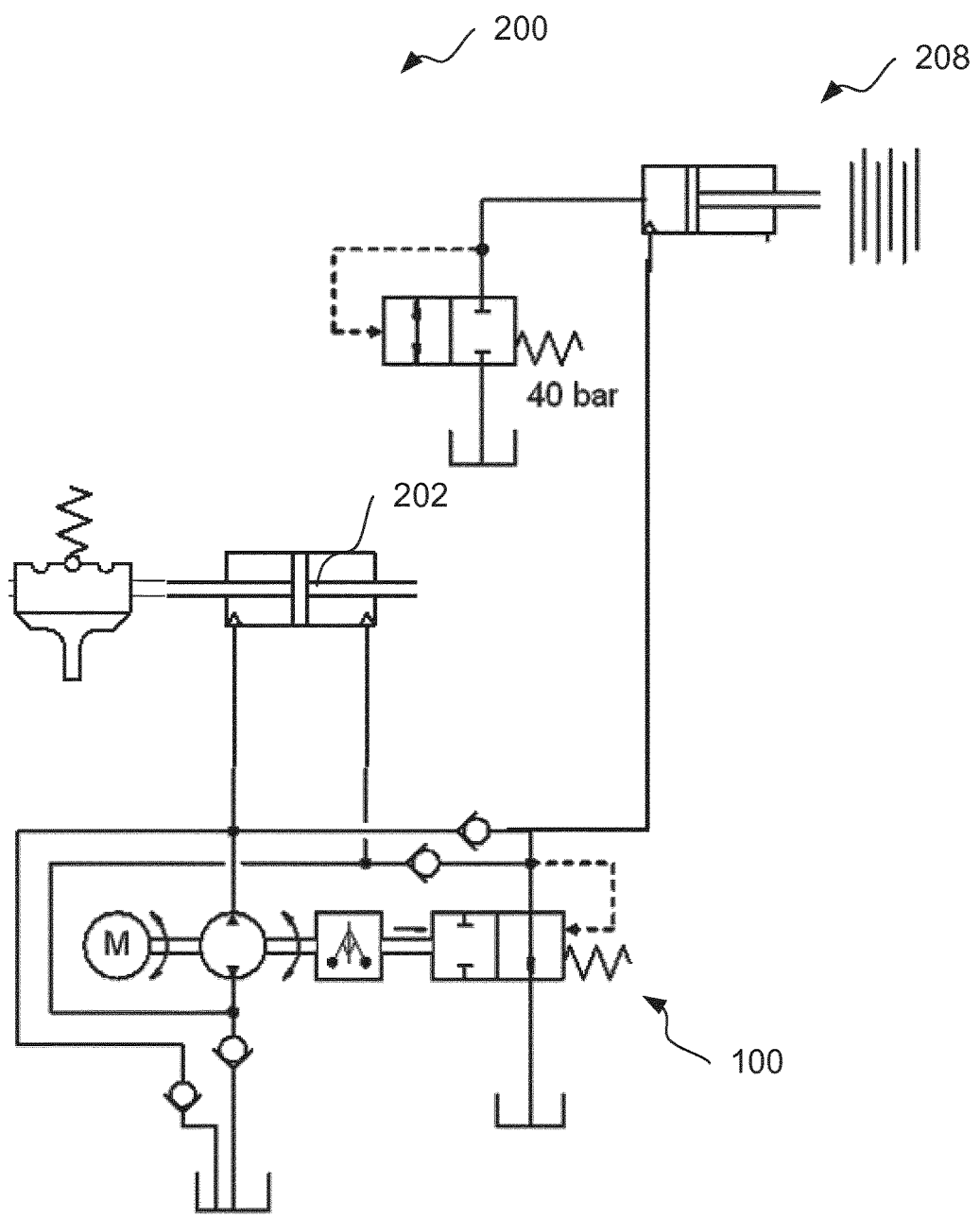

FIG. 13c shows a further embodiment of a hydraulic system 200, for which no mechanical lock is provided. This embodiment is identical to the embodiment shown in FIG. 13b, except for the omission of the connection to the mechanical lock. Hence, operating the pump assembly 100 in a first direction will provide low range, while a reversed direction will provide high range. Locking will be achieved by torque control of the AWD clutch 208, and a position sensor may be provided for accurately determining the position of the shift piston.

In the low range lock (1) the range shift is in position "1" and the AWD clutch is active. In neutral (2) the range shift is in neutral position and the AWD clutch is open. The high range auto/lock (3) corresponds to arranging the range shift in a high position while the AWD clutch is active.

Figure 13D:
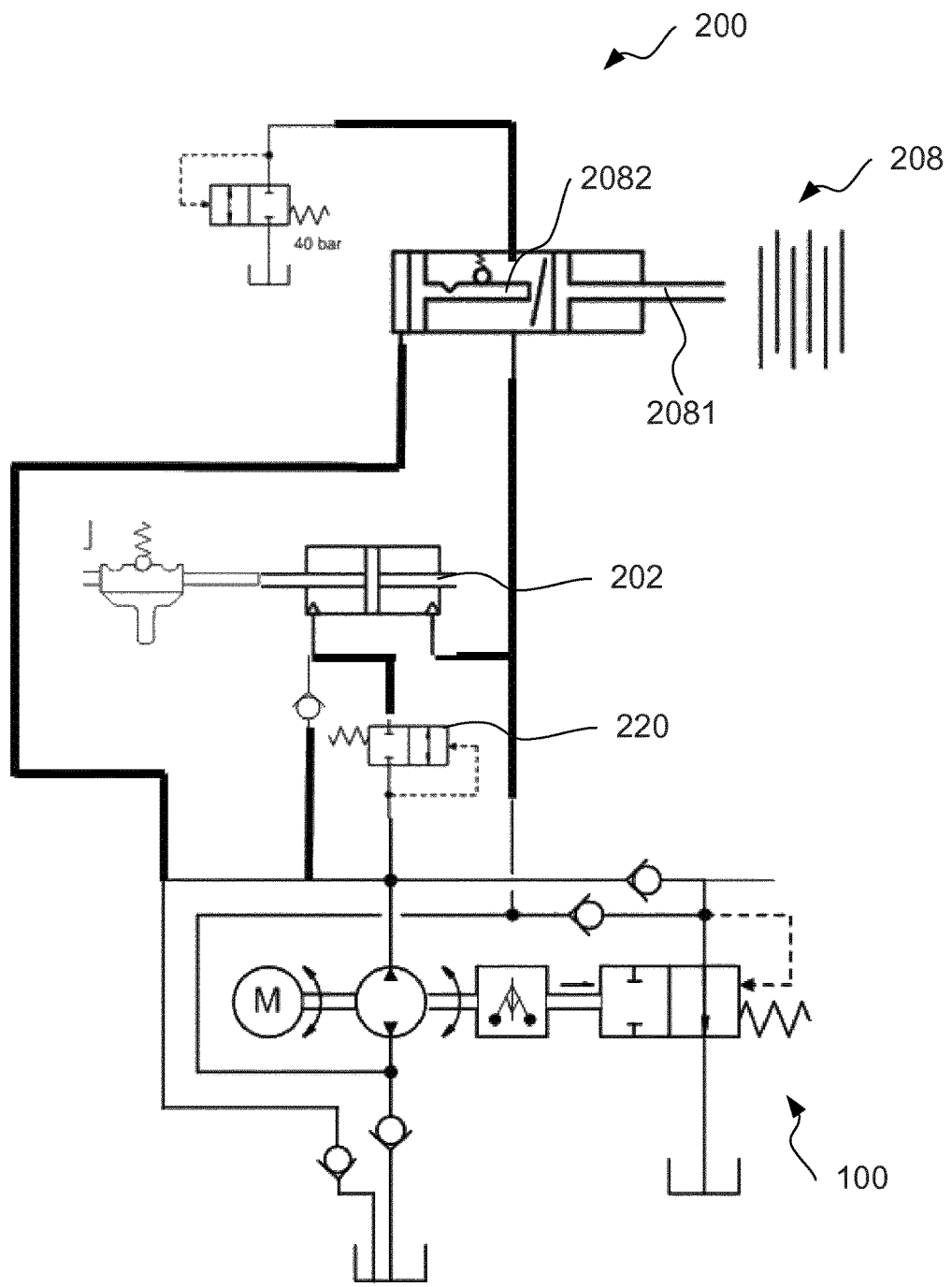

FIG. 13d shows a further embodiment of a hydraulic system 200 for a transfer case. In this embodiment no low range auto is possible, but only low range lock. Similarly to the previous embodiments shown in FIGS. 13b-c a reversible pump assembly 100 is in fluid connection with a shifting piston 202 and an AWD clutch 208. The piston 2081, actuating the AWD clutch, is provided with a piston lock mechanism 2082 which is designed to lock the piston 2081 at e.g. 20 Bars. The shifting sequence of the shift piston 202 is: i) high range auto, ii) neutral, iii) high range lock, and iv) low range lock. The low range lock is achieved by means of a valve 220 arranged between the pump assembly 100 and the shifting piston 202, which opens at approximately 30 Bars for shifting to low range lock.

Figure 14:
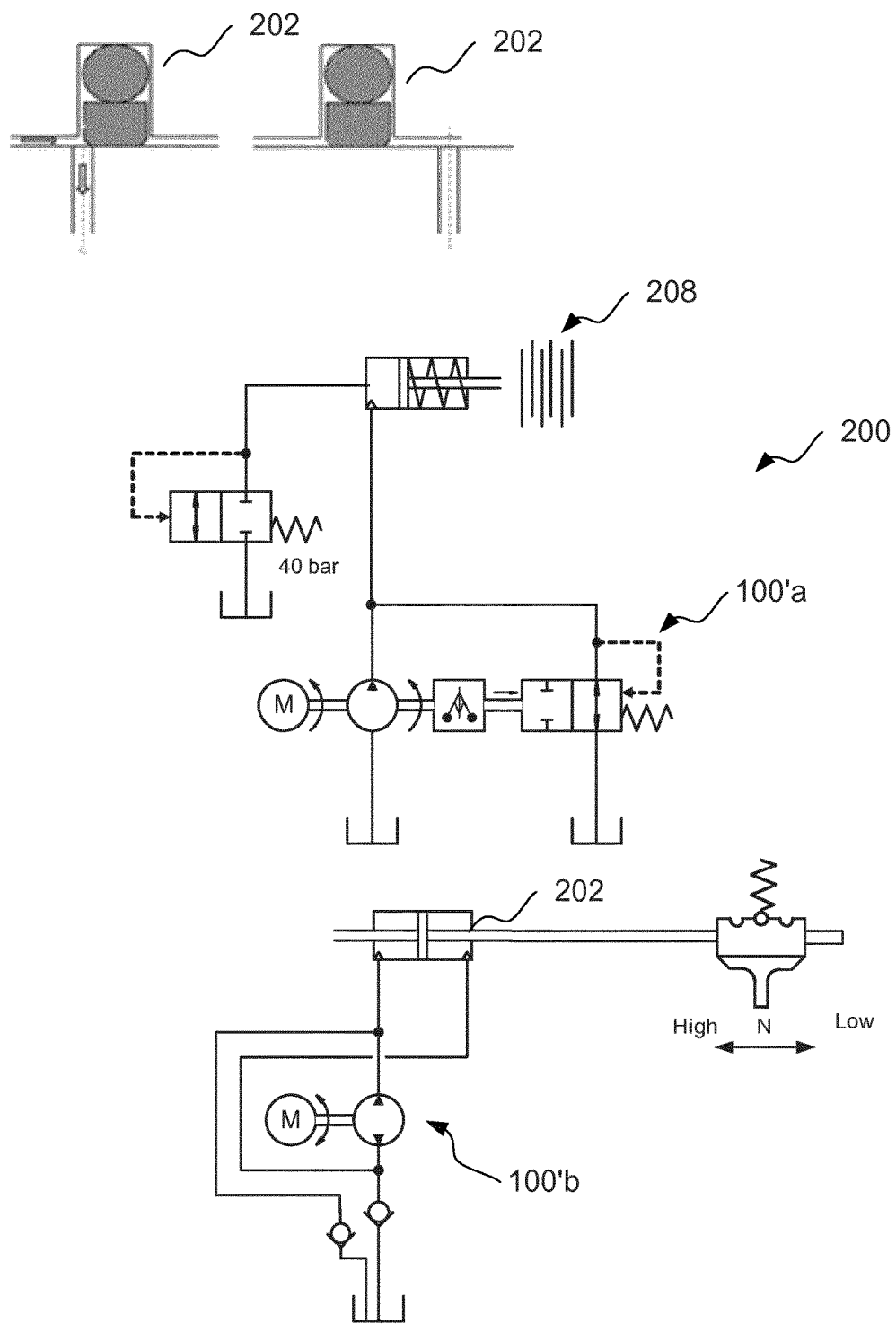
FIG. 14 shows a hydraulic scheme of a hydraulic system according to an embodiment.

In FIG. 14 a further embodiment of a hydraulic system 200 is shown using two pump assemblies 100'a, 100'b. A first pump assembly 100'a is the same as being described with reference to e.g. FIG. 3, and used to actuate the AWD clutch 208. A small reversible pump assembly 100'b, preferably of a low cost gerotor type with two inlet check valves, is provided for shifting the piston 202 between low and high range.

As an option the shifting piston 202 may have sealings that in end positions pass small outlet holes. Hence the pressure, as well as the drive current goes down and the end positions may be detected.

Figure 15:
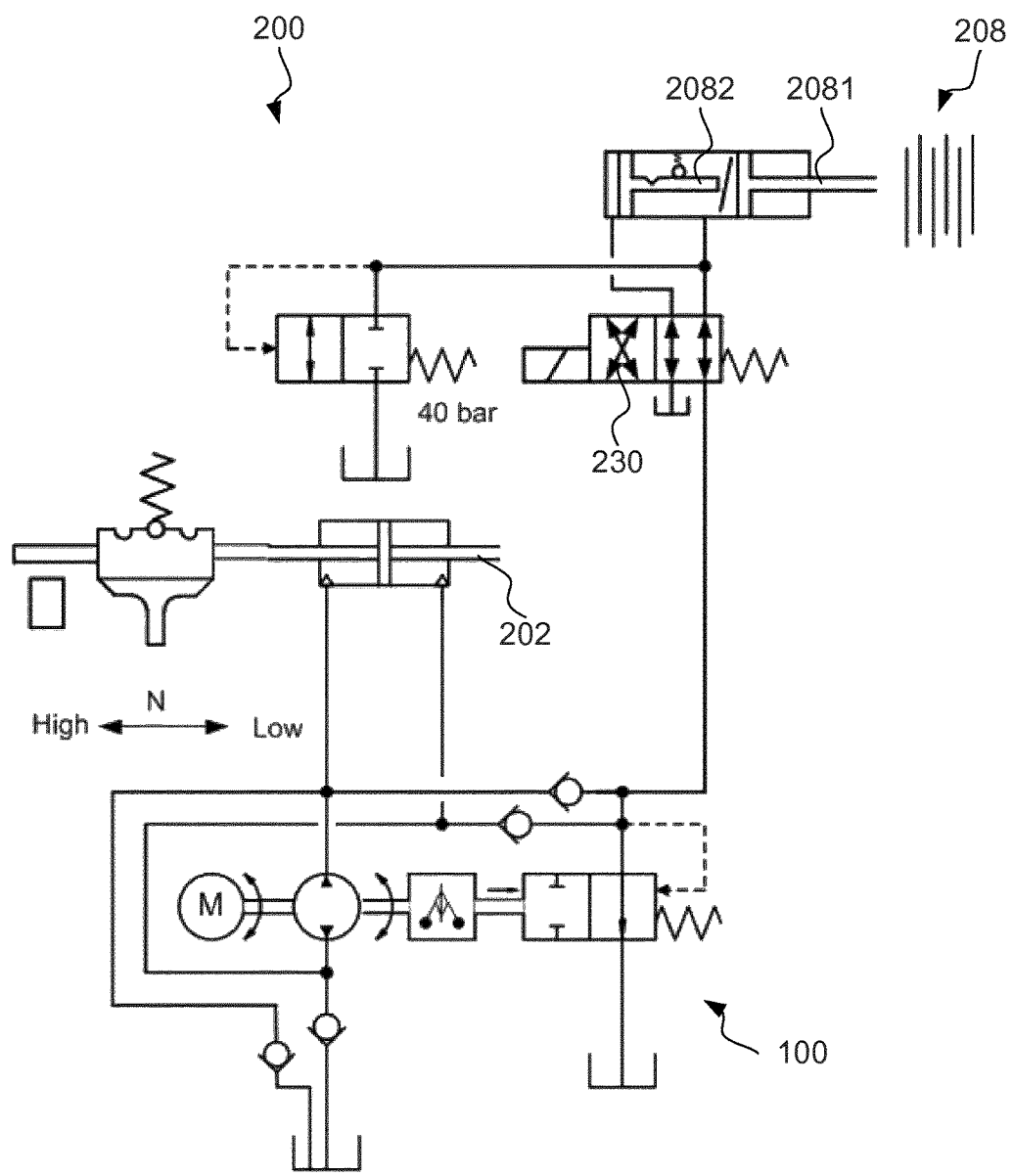
FIG. 15 shows a hydraulic scheme of a hydraulic system according to an embodiment.

FIG. 15 shows a further embodiment of a hydraulic system 200 having so called full functionality. No separate mechanical lock is provided, but lock mode is achieved by controlling the AWD clutch 208 by means of a solenoid switch valve 230 connected to a piston lock mechanism 2082 of the AWD clutch 208. The shift piston 202, operating in either low range, neutral, or high range, is controlled by means of a reversible pump assembly 100 which when operated in a first direction achieves low range, and in a reversed direction achieves high range. AWD lock is thus available for both low range and high range.

Figure 16:
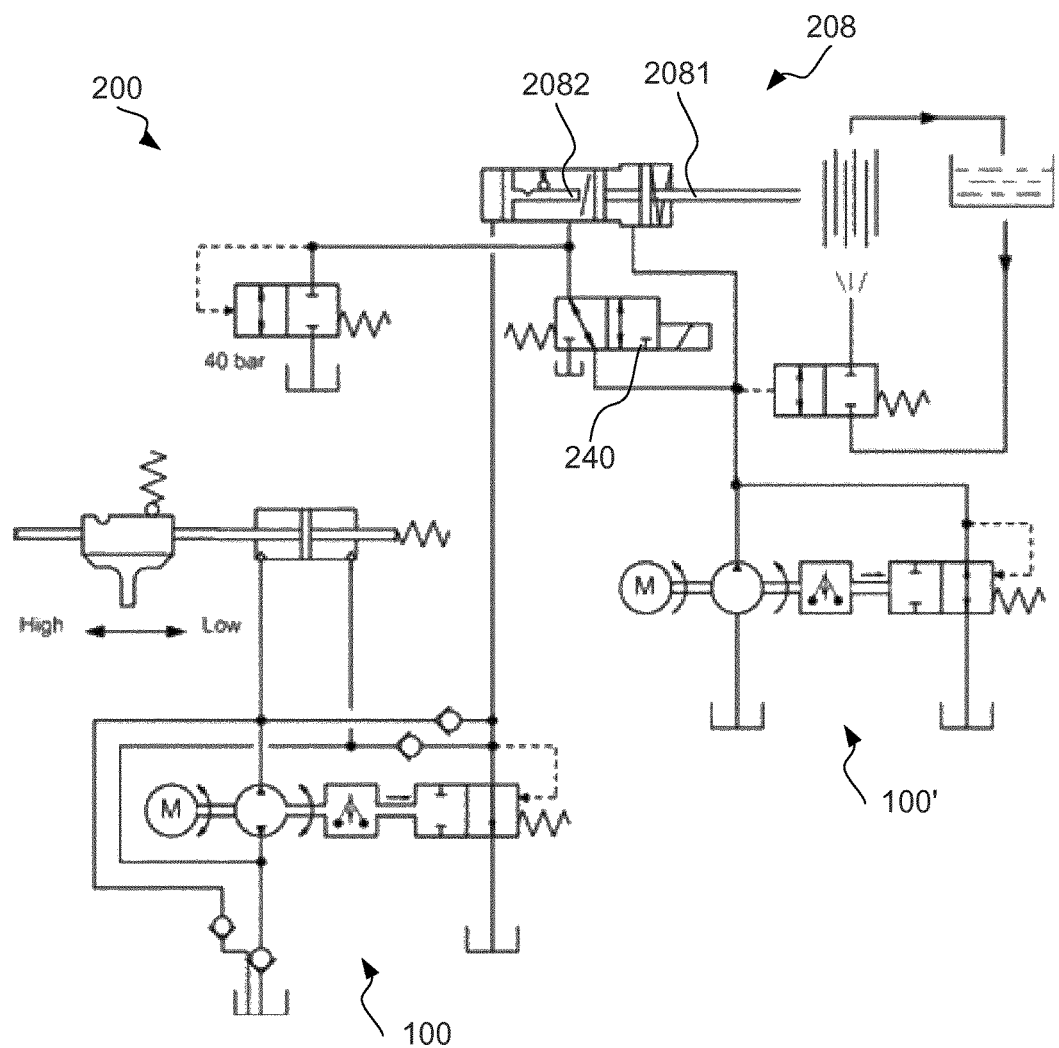
FIG. 16 shows a hydraulic scheme of a hydraulic system according to an embodiment.

In FIG. 16 a further embodiment of a hydraulic system 200 is shown. The hydraulic system 200 comprises a first one-directional pump assembly 100' for actuating the AWD clutch 208, and a reversible pump assembly 100 for actuating the shifting piston 202. The reversible pump assembly 100 applies pressurized fluid to the piston lock mechanism 2082, which is further controlled by pressure from the one-directional pump assembly 100' via a solenoid switch valve 240. Unlocking the AWD clutch 208 is thus possible.

Figure 17:
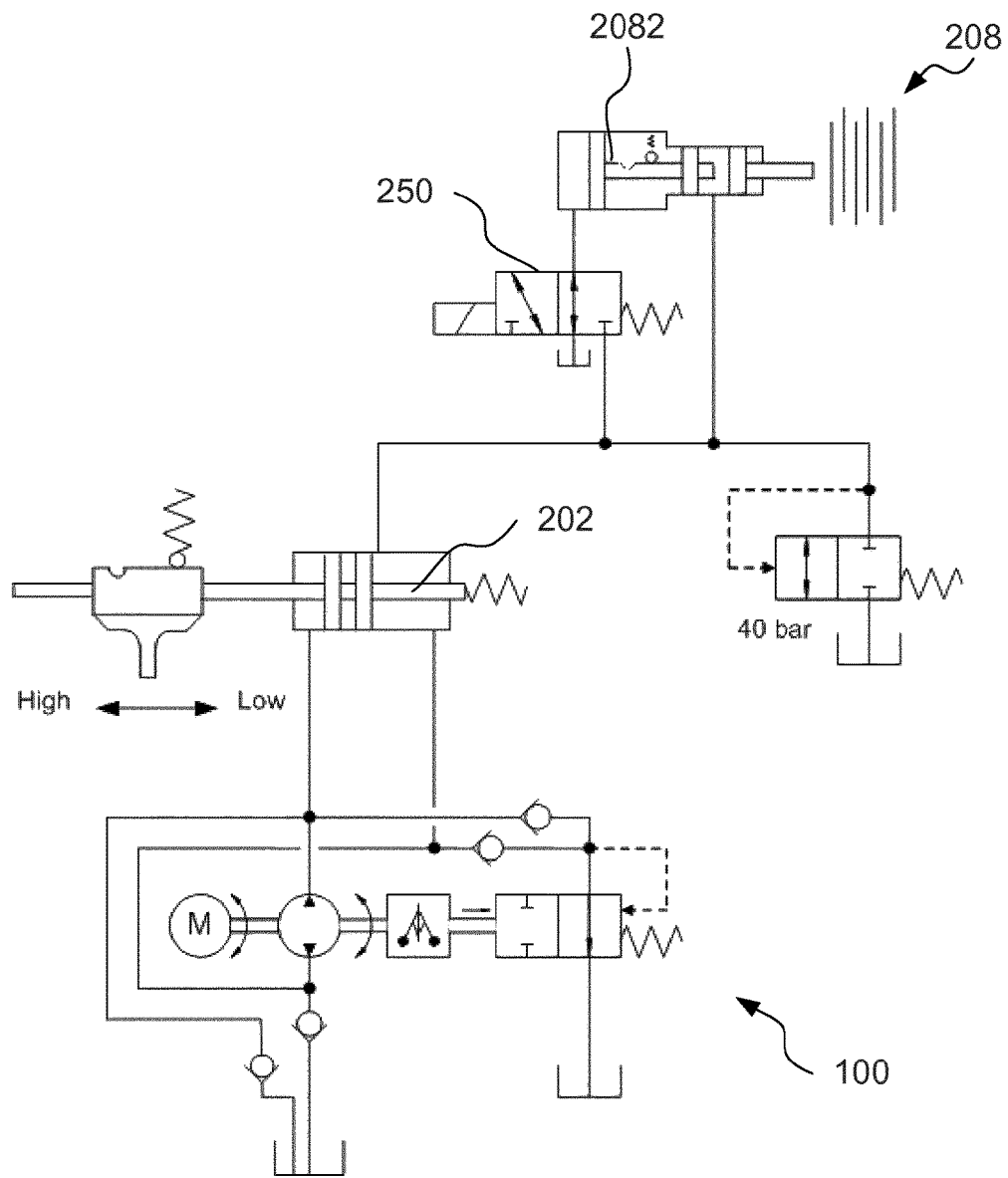
FIG. 17 shows a hydraulic scheme of a hydraulic system according to an embodiment.

In FIG. 17 a yet further embodiment of a hydraulic system 200 is shown. Here, a reversible pump assembly 100 is operated to move a shifting piston 202 bidirectional, whereby the shifting piston controls a shifting mechanism to change between low range and high range. When the shifting piston 202 has reached one of its end positions the channel 212 to the AWD clutch 208 is opened, whereby the AWD clutch 208 is actuated. Upon this pressurized fluid is also supplied to a piston lock mechanism 2082 of the AWD clutch 208 via a controllable solenoid switch valve 250.

The piston lock mechanism 2082 is formed by a piston, of which the effective piston area is reduced similarly to what has been described in WO2014/131531 by the same applicant.

It will be appreciated that the embodiments described in the foregoing may be combined without departing from the scope as defined by the appended patent claims.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

The invention claimed is:

1. A hydraulic system for a vehicle, comprising
a hydraulically actuated clutch,
a hydraulically actuated shifting piston, and
a pressure source for actuating the clutch as well as the shifting piston wherein the pressure source is a reversible pump,
the shifting piston being adapted to upon movement also mechanically control a valve function which serves to open a connection from the pressure source to the clutch only when the shifting piston has reached one of its end positions.

2. The hydraulic system according to claim 1, further comprising a pilot controlled ball valve arranged between the pressure source and the clutch, and wherein the shifting piston is configured to open a pressure channel for providing a pilot pressure to the ball valve.

3. A hydraulic system for a vehicle, comprising
a hydraulically actuated clutch,
a hydraulically actuated shifting piston movable between two end positions, and
a pressure source for actuating the clutch as well as the shifting piston,
the shifting piston forms a valve which is adapted to, when arranged in an end position of the two end positions, allowing the pressure source to apply pressure to the clutch through one of two different paths, and, when moving between the two end positions, preventing the pressure source to apply pressure to the clutch.

4. A transfer case, comprising
a hydraulically actuated clutch,
a hydraulically actuated shifting piston, and
a pressure source for actuating the clutch as well as the shifting piston,
the shifting piston being adapted to upon movement also mechanically control a valve function which serves to open a connection from the pressure source to the clutch only when the shifting piston has reached one of its end positions.

5. The transfer case of claim 4, wherein the hydraulically actuated clutch is an AWD coupling configured to change driving mode between two wheel drive and four wheel drive, and the hydraulically actuated shifting piston is configured to change between low range gear and high range gear of the transfer case.

6. A method for operating a transfer case comprising:
providing a transfer case comprising a hydraulically actuated clutch for changing driving mode between two wheel drive and four wheel drive, a hydraulically actuated shifting piston being adapted to upon movement also mechanically control a valve function for changing between low range gear and high range gear, and a pressure source for actuating the clutch as well as the shifting piston;
moving the shifting piston between two end positions, wherein the shifting piston forms a valve which, when arranged in an end position, allows the pressure source to apply pressure to the clutch, and, when moving between the two end positions, prevents the pressure source to apply pressure to the clutch.

7. A hydraulic system for a vehicle, comprising
a hydraulically actuated clutch,
a hydraulically actuated shifting piston, and
a pressure source for actuating the clutch as well as the shifting piston, the shifting piston being adapted to upon movement also control a valve function which serves to open one of a first connection or a second connection from the pressure source to the clutch only when the shifting piston has reached one of its end positions, and so that the movement of the shifting piston to a first end position provides a first path from the pressure source to the clutch, and movement of the shift piston to the second end position provides a second path from the pressure source to the clutch, wherein the first path is different than the second path.

8. A transfer case, comprising
a hydraulically actuated clutch,
a hydraulically actuated shifting piston, and
a pressure source for actuating the clutch as well as the shifting piston,
the shifting piston being adapted to upon movement also control a valve function which serves to open a connection from the pressure source through a first valve or a second valve to the clutch only when the shifting piston has reached one of its end positions.

9. A hydraulic system for a vehicle, comprising
a hydraulically actuated clutch,
a hydraulically actuated shifting piston, and
a pressure source for actuating the clutch as well as the shifting piston,
the shifting piston being adapted to upon movement to one of two end positions urges one of two valves to open thereby allowing hydraulic pressure to be applied to the clutch.

10. A method for operating a transfer case comprising:
providing a transfer case comprising a hydraulically actuated clutch for changing driving mode between two wheel drive and four wheel drive, a hydraulically actuated shifting piston for changing between low range gear and high range gear, and a pressure source for actuating the clutch as well as the shifting piston;
moving the shifting piston between two end positions, wherein the shifting piston forms a first valve which, when arranged in an end position, urges one of a second valve or a third valve to open thereby allowing hydraulic pressure to be applied to the clutch, and, when moving between the two end positions, prevents the pressure source to apply pressure to the clutch.

11. A hydraulic system for a vehicle, comprising
a hydraulically actuated clutch;
a hydraulically actuated shifting piston;
a pressure source for actuating the clutch as well as the shifting piston;
the shifting piston being adapted to upon movement also mechanically control a valve function which serves to open a connection from the pressure source to the clutch only when the shifting piston has reached one of its end positions; and
a pilot controlled ball valve arranged between the pressure source and the clutch, and wherein the shifting piston is configured to open a pressure channel for providing a pilot pressure to the ball valve.

* * * * *